Nov. 12, 1946.   H. C. FORD ET AL   2,411,087
STABLE VERTICAL
Filed July 7, 1937   4 Sheets-Sheet 1

INVENTORS
Hannibal C. Ford
Elliott P. Ross
BY
ATTORNEY

Patented Nov. 12, 1946

2,411,087

UNITED STATES PATENT OFFICE 2,411,087

STABLE VERTICAL

Hannibal C. Ford, Great Neck, and Elliott P. Ross, Forest Hills, N. Y., assignors to Ford Instrument Company, Inc., Long Island City, N. Y., a corporation of New York Application July 7, 1937, Serial No. 152,358

21 Claims. (Cl. 74—5)

The invention herein disclosed relates to a gyroscopic mechanism for use on a moving craft and in particular to a vertical-seeking or level gyroscopic mechanism that is suitable for providing a reference for the true vertical and horizontal.

It is a well known fact that a perfectly balanced, freely mounted or neutral gyroscope remains stationary in space; that is, its spin axis remains parallel with its original position as the gyroscope support is moved in space by the rotation of the earth or the combined movement of the earth and a vehicle or craft upon which the gyroscope may be mounted. In order to provide a vertical-seeking or level gyroscope that will remain with its spin axis vertical at all times, it is necessary to apply precessing forces to the gyroscope to compensate for small unbalances and the effect of the rotation of the earth in accordance with the latitude of the craft on which the gyroscope may be mounted. Such forces for seeking and maintaining the vertical may be applied through a suspended mass, acting as a pendulum and so designating the vertical, providing the pendulum is not caused to depart from the true vertical by accelerations of the support or craft on which the gyroscopic mechanism is mounted. Precessional forces to compensate for the effect of the rotation of the earth may be applied directly to the gyroscopic system.

In accordance with this invention there is provided a suspended mass that serves as a reference for the true vertical. Whenever the gyroscope departs from the true vertical, a precessing force is applied to the gyroscope so that the gyroscope is precessed in a direction to maintain its spin axis vertical. In order to prevent the suspended mass from departing from the true vertical and assuming the pseudo-vertical when the suspended mass is subject to accelerations, these acceleration forces are continuously measured and generated forces are applied to the pendulum to prevent the drag of the pendulum or tendency to depart from the true vertical upon changes in movement of the craft upon which it is mounted. The suspended mass is thus caused to indicate the true vertical at all times and the gyroscope is precessed to agree with the suspended mass as deviations occur between the vertical as represented by the suspended mass and the spin axis of the gyroscope.

A gyroscopic mechanism of this type is shown diagrammatically in Fig. 1 of the drawings and in Fig. 1a there is illustrated a movement diagram of the craft upon which the gyroscope is mounted; Figs. 2a and 2b diagrammatically illustrate a similar gyroscopic mechanism but one that is mounted upon a rotatable platform; Fig. 3 is a motion diagram for the gyroscopic system illustrated in Fig. 2a and 2b; Fig. 5 is a sectional view taken on the line 5—5 of Fig. 2a.

Figures 1, 1A, 3:
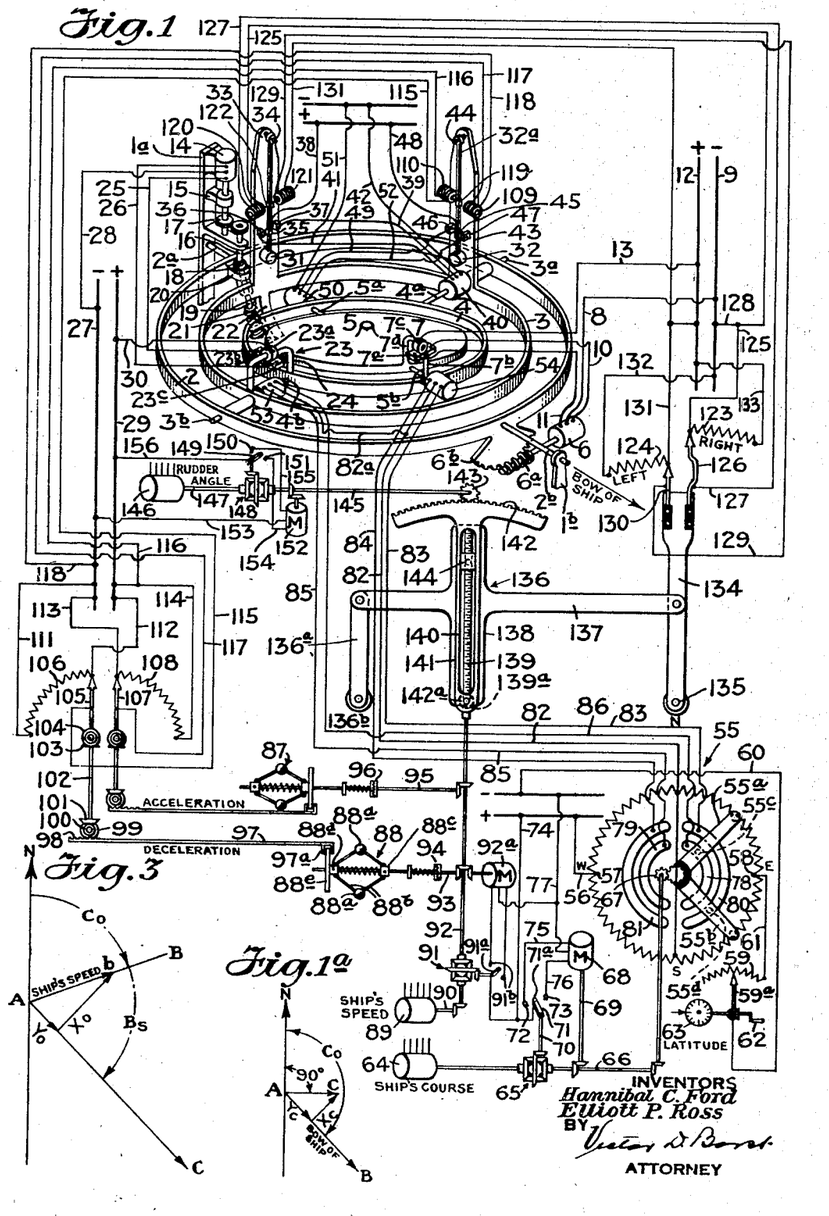

In Fig. 1 of the drawings, the gyroscope support is represented by a pair of standards 1a and 1b which are permanently secured to the deck of a ship upon which the gyroscope is mounted. In the construction illustrated in Fig. 1, the standards 1a and 1b form bearings for trunnions 2a and 2b that extend from a gyroscope frame 2. The standards 1a and 1b are so positioned, that the axes of the trunnions 2a and 2b of the frame are parallel to the fore and aft line of the ship. Within the frame 2, there is mounted a phantom ring 3. The phantom ring 3 has trunnions 3a and 3b that are journaled in the frame 2, the axes of the trunnions 3a and 3b being athwartship or at an angle of 90° to the trunnion axis of the frame. Within the phantom ring 3 there is a gimbal ring 4 having trunnions 4a and 4b that are journaled in the phantom ring and the axis of which is parallel to the axes of the trunnions 3a and 3b of the phantom ring 3. Within the gimbal 4, the gyroscope 5 is mounted for oscillatory movement about trunnions 5a and 5b, that extend from the case of the gyroscope and that are journaled in the gimbal ring 4 and at an angle of 90° from the trunnion axis 4a and 4b.

Movement of the gyroscope about the axes 5a and 5b relative to the gimbal ring 4 controls the movement of the frame 2 about the trunnions 2a and 2b. This movement of the frame 2 is effected through a follow-up motor 6 and electrical contacts 7. The follow-up motor 6 is connected to the frame 2 through a worm 6a mounted upon the shaft of the follow-up motor 6 and a segmental worm gear 6b that is secured to the frame and that is mounted concentric with the trunnion axis of the frame. The contacts 7 include a pair of spaced, electrically insulated contacts 7a that are mounted on a bracket 7b secured to the gimbal ring 4, and a roller contact 7c that is mounted on a bracket 7d secured to the case of the gyroscope. As relative movement between the gyroscope and the gimbal ring 4 occurs about the trunnions 5a and 5b, the contact 7c rides off of the central insulated section between the contacts 7a and on to one or the other of the contacts. Such contact between the contacts 7c and 7a causes the operation of the motor 6 in a direction corresponding to the direction of movement of the gyroscope with respect to the gimbal ring 4. To effect this operation, one side of the motor 6 is connected through a wire 8 to a line wire 9. The contacts 7a are separately connected to the motor through wires 10 and 11 and the contact 7c is connected to line wire 12 by a wire 13.

Similarly, movement of the gimbal ring 4 about the trunnions 4a and 4b relative to the phantom 3 is reproduced in the phantom ring. The reproduction of the movement of the gimbal ring is effected through a follow-up motor 14. The shaft of this motor extends through a bracket 15 secured to the standard 1a and it is connected to a shaft 16 by means of a pair of spur gears 17. The shaft 16 has a flexible joint 18 therein in line with the trunnions 2a, 2b and an inclined section 19. The inclined section extends through a bracket 20 on the frame 2 and carries a worm 21 that meshes with a segmental worm gear 22, the segmental gear 22 being concentric with the axis of the trunnions 4a and 4b. Operation of the motor 14 in accordance with relative movement between the gimbal ring 4 and the phantom 3 is effected by means of contacts 23. These contacts 23 include a roller 23a that is mounted upon the phantom ring 3 and two spaced contacts 23b and 23c that are mounted on a bracket 24 secured to the gimbal ring 4. When the gimbal ring 4 and the phantom 3 are in alignment, the roller 23a rests on an insulated section between the contacts 23b and 23c. Upon relative movement between the phantom 3 and the gimbal ring 4, the roller 23a rides upon one or the other of the contacts 23b or 23c. The contact between the contact 23a and the contacts 23b and 23c effects the operation of the motor 14. For this purpose, the contacts 23b and 23c are connected to the motor by wires 25 and 26. One side of the motor is connected to a negative line wire 27 by a conductor 28 and the other line wire 29 is connected by a conductor 30 to the contact 23a.

From the foregoing it will be seen that the phantom ring 3 corresponds at all times with the gyroscope 5. If the spin axis of the gyroscope is vertical the phantom ring 3 will be horizontal and represent a true horizontal plane. Any deviation of the spin axis of the gyroscope from the true vertical will cause the phantom ring 3 to deviate in like manner from the horizontal.

For the purpose of maintaining the gyroscope with its spin axis vertical, there are provided a pair of pendulums 31 and 32. The pendulum 31 is mounted on a bracket 33 that is secured to the phantom ring and extends vertically therefrom. The bracket 33 is adjacent the trunnion 2a about which the frame 2 oscillates. The pendulum 31 is mounted on the bracket 33 to swing about an axis or pivot 34 that is generally parallel to the trunnion axis of the frame 2. On the arm of the pendulum 31, there is mounted an electrical contact 35. The contact 35 cooperates with a contact 36 and a contact 37 mounted on the bracket 33. The contact 35 is connected by a conductor 38 to the positive side of the line. The contact 37 is connected by a conductor 39 to a torque applicator 40 and the contact 36 is likewise connected to the torque applicator 40 by a conductor 41. The torque applicator 40 is also connected to the negative line wire by a conductor 42. It will be noted that the torque applicator 40 is mounted on the phantom ring 3 and connected to the trunnion 4a of the gimbal ring so that a torque is applied to the gimbal ring 4 about the trunnions 4a, 4b, whenever the contact 35 on the pendulum engages either the contact 36 or 37 secured to the bracket 33, the direction of the torque on the gimbal ring being determined by the contact engaged by contact 35. With this arrangement, it will be seen that whenever the phantom ring 3 is inclined to the horizontal by virtue of the movement of the frame 2 about its trunnions 2a and 2b, a torque will be applied to the gimbal ring about the axes 4a and 4b. A torque applied to the gimbal ring in this manner will cause the gyroscope to precess about the axes 5a, 5b. Such precession of the gyroscope will be transmitted to the frame and the frame will be moved to a position in which the pendulum is so suspended that the contact 35 is between the contacts 36 and 37.

The pendulum 32 is similarly mounted on a bracket 43 that is secured to the phantom ring 3. The bracket 43 is mounted on the phantom ring 3 adjacent to the trunnion 3a of the phantom ring. In this case, the pendulum 32 is mounted to swing about a pivot or axis 44 that is parallel to the axis 3a, 3b of the phantom ring. On the arm 32a of the pendulum, intermediate the ends thereof, there is mounted an electrical contact 45. This contact 45 is between contacts 46 and 47 that are mounted upon the bracket 43. The contact 45 is connected to the positive side of the line by a conductor 48. The contact 46 is connected by a conductor 49 to a torque applicator 50. The torque applicator 50 is mounted upon the gimbal ring 4 and positioned and connected to apply a torque about the trunnion 5a of the gyroscope. The torque applicator is connected to the negative side of the line by a conductor 51. A conductor 52 connects the torque applicator to the contact 47. It will thus be seen that when the phantom ring 3 moves from the horizontal position about the trunnions 3a, 3b, the contact 45 on the pendulum 32 will engage either the contact 46 or 47 depending upon the direction of the movement of the phantom ring. Upon engagement of the contact 45 and either of the contacts 46 or 47 the torque applicator 50, which may be an ordinary motor, will be energized and apply a torque to the trunnion 5a of the gyroscope. The torque applied to the trunnion 5a of the gyroscope will cause precession of the gyroscope to effect movement of the gimbal ring about the trunnions 4a, 4b. Through the follow-up motor 14, the phantom ring will be restored to the position in which the contact 45 on the pendulum 32 is between the contacts 46 and 47.

From the foregoing description of the gyroscope and the pendulums it will be seen that the gyroscope receives precessional forces to maintain it with its spin axis vertical. Whenever the gyroscope departs from the position in which its spin axis is vertical, the phantom ring likewise departs from the horizontal and the relative movement of the pendulums about their axes of oscillation effects a precessional force on the gyroscope to return the gyroscope with its spin axis vertical and the phantom ring to a truly horizontal position. This pendulous control of the gyroscope takes care of all ordinary conditions. The pendulums cause the gyroscope to quickly settle upon the true vertical when the gyroscope is started up, returns the gyroscope to the true vertical when accidentally displaced therefrom, and keeps the gyroscope from wandering due to unbalances in the system.

This pendulous operation of the gyroscope may also take care of such factors as rotation of the earth and movement of the ship over the earth. However, a gyroscope to remain vertical must be precessed at the rate of 15° or less per hour, depending upon the latitude at which the gyroscope is located, to compensate for the rotation of the earth. This of course would necessitate the contacts of the pendulum always making and breaking or trying to maintain this uniform rate of precession.

Since the precession requisite to compensate for the rotation of the earth is uniform, forces are generated proportional to the rotation of the earth and these forces are applied to the gyroscope to effect the uniform precession of the gyroscope in accordance with the rotation of the earth. As the forces must be applied about the mutually perpendicular precessional axes of the gyroscope it is necessary to resolve the effect of the rotation of the earth into components along these axes. An exemplifying set of conditions is illustrated in Fig. 1a of the drawings. Here the line AN represents the North and AB represents the direction of movement of the ship or the fore and aft line of the ship on which the gyroscope is mounted. The line AC represents the correction necessary for the rotation of the earth at the particular latitude at which the ship is located. By resolving the line AC into its components along and across the fore and aft line of the ship, there is obtained the components Yc and Xc, the component Yc being along the fore and aft line of the ship or the trunnion axis 2a, 2b of the frame 2, and the component Xc being athwartship or along the trunnion axis 3a, 3b of the phantom ring 3.

For the purpose of providing a uniform precession of the gyroscope in accordance with the rotation of the earth, there are provided electrically actuated torque applicators 53 and 54. The torque applicator 53 is mounted on the phantom ring 3 and connected to apply a torque to the trunnion 4b of the gimbal ring 4. The torque applicator 54 is mounted upon the gimbal ring 4 and connected to apply a torque to the trunnion 5b of the gyroscope. It will be understood that the torque applicators 53 and 54 might be combined with the torque applicators 40 and 50 respectively; they are shown separated, however, for the purpose of simplifying the illustration and description of the operation of the mechanism.

The extent of the energization of these torque applicators is determined by a resistance unit 55. The resistance unit 55 is circular and it is connected to the positive line wire by a conductor 56 at a point 57 that may represent compass west. It is connected to the negative line wire at a point 58 diametrically opposite to the point 57, through another resistance 59. This connection is as follows: the conductor 60 connects the negative line wire to the arm 59a of the variable resistance 59. The resistance 59 is connected to the resistance unit 55 by a conductor 61. The variable resistance 59 is utilized for modifying the effect of the resistance unit 55 in accordance with the cosine of the latitude at which the ship is operating. The arm 59a is moved over the resistance by a handle 62. Rotation of the handle 62 operates the arm 59a and also a dial 63 which indicates the latitude. The handle 62 is therefore rotated until the dial indicates the latitude at which the ship is operating. In such position, the resistance 59 modifies the voltage across the resistance 55 in accordance with the cosine of the latitude.

The resistance unit 55 includes a pair of arms 55a and 55b that are rigidly secured together and angularly displaced through an angle of 90°. These arms are moved over the resistance 55 in accordance with the angle $C_0$ or the compass angle of the ship. This is accomplished through a compass repeater 64. The compass repeater is connected to one side of a differential 65 and the other side of the differential is connected to a shaft 66 that operates the arms 55a and 55b through a gear 67. Likewise connected to the shaft 66 is a follow-up servo-motor 68 which is connected to the shaft 66 through a shaft 69. The servo-motor is controlled by the center of the differential 65 which is connected through a shaft 70 to a movable electrical contact arm 71. The contact arm 71 carries a contact 71a that cooperates with contacts 72 and 73. The contact 71a is connected to the positive side of the line wire by a conductor 74. The contact 72 is connected by a conductor 75 to the motor 68 and contact 73 is connected to the motor 68 by a conductor 76. The motor is connected to the negative line wire by a conductor 77. From the foregoing it will be seen that as the compass repeater operates, one side of the differential is operated and since the other side represented by the shaft 66 is stationary, the contact arm 71 will be operated so that contact is made between the contact 71a and either one of the contacts 72 or 73. This will cause the motor 68 to operate and will operate shaft 66 until contact arm 71 is positioned between the contacts 72 and 73. Operation of the shaft 66 will, however, through the gear 67 effect rotation of the arms 55a and 55b over the resistance 55 until the arm 55b assumes a position relative to the representative north and south line indicated in Figure 1, in which position the arm 55b makes the angle $C_0$ with the said representative north and south line. The resistance 55 is a non-uniform resistance and so distributed that the voltages under the arms 55a and 55b relative to that impressed on the conductor 82 vary in accordance with the sine of the angle that the respective arm makes with the representative north and south. The voltage thus obtained under the arm 55b varies in accordance with the sine of the course angle $C_0$ of the ship, and the voltage thus obtained under the arm 55a varies in accordance with the cosine of the angle $C_0$.

The arm 55a carries a contact 55c that engages an electrically conducting sector 78 when the arm 55a is on the side of the resistance in which it is illustrated and that engages a segmental electrical conductor 79 when the arm 55a is operating on the opposite side of the circular resistance. The arm 55b likewise carries a contact 55d which engages a semicircular electrical conductor 80 when operating on the half of the resistance on which the arm is illustrated in Fig. 1, and a segmental electrical conductor 81 when the arm is on the opposite side of the circular resistance.

The conductor 82 connects the resistance 55 at diametrically opposite points representing north and south and to the torque applicator 54 and a branch conductor 82a connects the conductor 82 to the torque applicator 53. In other words, diametrically opposite points of the resistor 55 representing the north-south line are connected in common to the torque applicators 53 and 54. The segmental electrical conductor 80 is connected by a wire 83 to one side of the torque applicator 54 and the other side of the torque applicator is connected by a conductor 84 to the segmental electrical conductor 81. The segmental electrical conductor 79 is connected by a wire 85 to one side of the torque applicator 53 and the segmental conductor 78 is connected by a wire 86 to the other side of the torque applicator 53. From the foregoing it will be seen that the resistance 55 is in the nature of a potentiometer and varies the amount and the direction of current that flows to the torque applicators 53 and 54 and thus the amount and direction of the torque applied to the gyroscope about the mutually perpendicular axes of the gyroscope.

The gyroscope will move about the axis 3a, 3b due to the angular velocity of the earth's rotation E at a rate equal to E cos φ sine C₀, in which φ represents the latitude of the ship; and about the axes 5a, 5b by E cos φ cos C₀. The resistance 55 coupled with resistance 59 is so graduated as to provide a current for the torque applicators proportional to these quantities. The current applied to the torque applicator 53 will be proportional to the quantity E cos φ cos C₀ and the current supplied to torque applicator 54 will be proportional to E cos φ sine C₀. The gyroscope will thus be continuously precessed at a rate to compensate for the effect of the rotation of the earth and this precession will maintain the gyroscope vertical in so far as the rotation of the earth is concerned. It will be noted that the combined precession to compensate for the rotation of the earth is constant while the ship remains at any particular latitude regardless of the course of the ship.

As heretofore stated, the pendulums will represent the true vertical at all times only if they are not caused to depart from the true vertical by horizontal accelerations of the support on which the gyroscopic mechanism is mounted. In the mechanism disclosed in Fig. 1, the drag of the pendulums upon changes in the horizontal movement of the ship is offset and the centers of inertia of the pendulums are made to reproduce or follow the movement of the ship upon changes in the movement of the ship, by applying to the pendulums magnetic forces proportional to the changes in the movement of the ship. These changes in movement of the ship include changes in the speed of the ship while the ship is pursuing a definite course and changes in the direction of the movement of the ship, that is, changes in the course of the ship. For the purpose of compensating for the changes in speed of the ship, the acceleration is measured and magnetic forces are produced and applied to the pendulums to counter-balance the drag due to the inertia of the pendulums. Thus the center of inertia of the pendulums, instead of lagging relative to the ship as it accelerates, are accelerated at the same rate and as a result the pendulums are maintained truly vertical.

The mechanism for this purpose includes two centrifugal devices 87 and 88, one for accelerations and the other for decelerations. The speed of the ship is obtained from a receiver 89 which is connected by a shaft 90 to one side of a differential 91. The other side of the differential 91 is connected by shaft 92 to a shaft 93 which connects with a unidirectional clutch (shown diagrammatically) 94. The shaft 92 is also connected to a shaft 95 that is connected to another unidirectional clutch 96. The center of the differential operates a movable electrical contact 91a which in cooperation with stationary contacts 91b controls a follow-up servo-motor 92a that drives the shaft 92. The shaft 92 is thus driven by the servo-motor in accordance with the repeater 89 and therefore at a speed proportional to the rate of change of speed of the ship.

The clutch 94 is connected to the centrifugal device 88 which is in the nature of a tachometer and the unidirectional clutch 96 is connected to the centrifugal device 87. The centrifugal device 88 consists of a series of balls 88a each of which has a pair of oppositely extending pivotally connected arms 88b, one arm of which is pivotally connected to a collar 88c that is rotated through the unidirectional clutch 94. The other arm 88b is pivotally connected to a collar 88d. The collar 88d carries a disk 88e which extends between the forked end 97a of a rod 97. The collar 88d of the centrifugal device is forced away from the collar 88c by a spring 88f acting between the collars 88d and 88c. When there is no movement of the centrifugal device, the balls 88a are radially inward and the rod 97 is at the extreme left position.

On the end of the rod 97 opposite to the forked end 97a there is mounted a rack 98 which engages a gear 99. The gear 99 carries a bevel gear 100 which meshes with another bevel gear 101. The gear 101 is mounted on a shaft 102 having a bevel gear 103 which meshes with a bevel gear 104 that carries an arm 105. The arm 105 is electrically insulated from the gear 104 and the shaft upon which the gear rotates. The arm 105 is the arm of a potentiometer 106 over which it travels to vary the voltage of an electrical circuit of which the potentiometer forms a part.

If the speed of the ship decreases, the repeater 89 will operate and rotational movement will be transmitted from the shaft 93 through the unidirectional clutch 94 to the centrifugal device 88. Rotation of the centrifugal device will cause the balls to fly outwardly and move the disk 88e to the right against the force of spring 88f, an amount proportional to the speed of rotation of the device, thus causing a rotation of gear 99 and through the gear train just described a movement of the arm 105 over the resistance 106. Since the speed of rotation of the device is proportional to the rate of change of speed of the ship the displacement of the arm 105 over the resistance 106 will be proportional to such rate of change of speed or deceleration. The centrifugal device 87 is in all respects the same as the centrifugal device 88 and operates an arm 107 over a resistance 108. Thus on a speeding up of the ship the arm 107 will move over the resistance 108 and vary the voltage of the electrical circuit of which the resistance 108 forms a part in proportion to the rate of change of speed of the ship or acceleration.

The potentiometers 106 and 108 control the energization of electromagnets 109 and 110 that are mounted on the bracket 43 on opposite sides of the pendulum 32a. Changes in the speed of the ship will have no effect upon the pendulum 31 as this pendulum is mounted to swing about an axis that is parallel to the fore and aft line of the ship. These changes will however affect the pendulum 32 since this is mounted to swing about an axis at right angles to the fore and aft line of the ship.

One side of the resistance element of the potentiometer 106 is connected through a conductor 111 to the negative line wire 27. The other side of the resistance is connected through a conductor 112 to the positive line wire 29. Likewise, one side of the resistance element of the potentiometer 108 is connected through a wire 113 to the negative line wire 27, and the other side of the resistance is connected through a wire 114 to the positive line wire 29. The arm 105 is connected by a wire 115 to one side of the electromagnet 110 and the other side of the electromagnet 110 is connected by a line wire 116 to the wire 114 and thus to the positive line wire 29. It will thus be seen that with the arm 105 in the position in which it is illustrated, no current will flow to the magnet 110 but as the arm 105 moves over the resistance 106 during a decrease in speed of the ship, current will be supplied to the magnet 110 in proportion to the amount the arm 105 moves over the resistance 106 or in other words in proportion to the rate of decrease in speed of the ship.

The magnet 109 is similarly connected to the resistance 108 and to the line wires. The arm 107 is connected through a wire 117 to one side of the magnet 109. The other side of the magnet 109 is connected through a wire 118 to the negative line wire 27. From these connections it will be seen that with the arm 107 in the position indicated no current will flow to the magnet 109 but upon movement of the arm 107 over the resistance 108 upon acceleration in the speed of the ship, current will flow to the magnet 109 in proportion to the rate of increase in the speed of the ship.

Between the magnets 109 and 110 and mounted on the arm of the pendulum, there is an armature 119. The magnets 109 and 110 act upon this armature and the potentiometers 106 and 108 are calculated so that the force exerted by the magnets on the armature 119 is proportional to the inertia of the pendulum and the rate of change in movement of the ship. This force prevents the pendulum from lagging when there are changes in the speed of the ship or offsets the drag of the pendulum and causes the pendulum to follow the changes in the movement of the ship.

Changes in the course of the ship affect the pendulum 31 as this pendulum is mounted to swing about an axis that is parallel to the fore and aft axis of the ship. These changes in the course of the ship however do not have any effect upon the pendulum 32 as this pendulum is mounted to swing about an axis normal to the fore and aft line of the ship. To compensate for the centrifugal force acting on the pendulum 31 upon changes in the course of the ship, there are provided two electromagnets 120 and 121 mounted on the bracket 33. These electromagnets act upon an armature 122 mounted on the arm of the pendulum 31. The electromagnets 120 and 121 are connected respectively to the current supply through potentiometers 123 and 124 respectively. One side of the magnet 120 is connected to one side of the resistance element of the potentiometer 123 by a conductor 125. The other side of the magnet 120 is connected to a contact arm 126 by a conductor 127. Conductor 125 is also connected to the negative line wire 9 through a conductor 128. One side of the electromagnet 121 is connected by a conductor 129 to a contact arm 130 and the other side of the electromagnet 121 is connected by a conductor 131 to one end of the resistance element of the potentiometer 124 and also to the positive line wire 12. The other end of the resistance 124 is connected to the negative line wire 9 by conductor 132. One end of the resistance 123 is connected to the positive line wire 12 by a conductor 133. The arms 126 and 130 of the potentiometers 123 and 124 are mounted on a lever 134 that is pivoted at 135. The lever 134 forms a part of a multiplier 136.

The multiplier includes a link 137 that has a transverse bar 138 having a slot therein. The link 137 is pivotally connected at one end to the lever 134 and at the other end to a lever 136a that is pivoted at 136b. A screw-shaft 139 is rotatably mounted in a longitudinal slot 140 in an arm 141 which carries at one end a segmental rack 142 which meshes with a pinion 143. The screw shaft 139 is connected through a universal joint 139a to the shaft 92 to be rotated thereby in accordance with the speed of the ship and the screw on the shaft is such that it moves a block 144 from a pivot 142a an amount proportional to the square of the rotation of the screw-shaft 139, or, in other words, an amount proportional to the square of the speed of the ship. The block 144 is received and is slidably mounted in the slot in the bar 138. The pinion 143 meshing with the segmental rack 142 is rotated through a shaft 145 in accordance with the rudder angle of the ship. The rudder angle is the angle which the rudder makes with the fore and aft line of the ship. The radius on which a ship turns may be considered as inversely proportional to the rudder angle. The equation for centrifugal force is $MBW^2$ in which M is the mass, B the radius, and W the angular velocity. The angular velocity of turning of the ship W is proportional to $S/V$ where S is the speed. Therefore the centrifugal force $F_c$ acting on the pendulum 31 is $$MB \times \frac{S^2}{V^2} = M \times \frac{S^2}{V}$$

but B equals $1/R$ where R is the rudder angle. Therefore $F_c = MRS^2$.

The rudder angle of the ship is obtained from a repeater 146 which is connected by a shaft 147 to one side of a differential 148. The other side of the differential 148 is connected to the shaft 145. The center of the differential operates a central contact 149 which operates between stationary contacts 150 and 151. The contacts 149, 150 and 151 control a follow-up motor 152 which is also connected to the shaft 145. Thus, the repeater motor 146 operates the follow-up motor 152 so that the shaft is moved by the follow-up motor an amount corresponding to the movement of the repeater 146.

For this purpose the follow-up motor is connected to the negative line wire 27 by a conductor 153 and one side of the follow-up motor is connected to the contact 151 by a conductor 154 and the other side of the follow-up motor is connected to the contact 150 by a conductor 155. The central contact 149 is connected to the positive line wire 29 by a conductor 156. Thus upon operation of the repeater motor 146 the contact 149 engages the contact 150 or 151 depending upon the direction of operation of the repeater motor 146 and causes the operation of the follow-up motor 152 until the movement of the shaft 145 and therefore the opposite side of the differential corresponds to the movement of the repeater motor 146 and brings the contact 149 between the contacts 150 and 151.

In consequence of such operation, the bar 141 will be moved about the pivot 142a an amount proportional to the rudder angle of the ship. The product of the square of the speed of the ship as introduced by the screw 139 and the rudder angle as introduced by the pinion 143 will appear as movement of the lever 134 about the pivot 135.

Such movement will move the arms 126 and 130 over the resistances 123 or 124 and will cause one or the other of the magnets 120 and 121 to be energized proportional to the centrifugal force acting on the pendulum 31 due to the change in the course of the ship. These magnetic forces acting upon the pendulum will offset the centrifugal force of the pendulum, and in consequence cause the pendulum to follow the changes in the movement of the ship.

It will thus be seen that in this arrangement there is provided a freely mounted gyroscope, and the pendulums are provided for indicating the true vertical at all times. The gyroscope is continuously precessed to compensate for the rotation of the earth and so during uniform conditions maintained with its spin axis indicating the true vertical and the phantom ring the true horizontal. The pendulums serve to bring the gyroscope to the true vertical on starting up or if it is accidentally displaced therefrom and prevent the gyroscope from wandering off of the vertical. The acceleration forces due to changes in the speed and course of the ship are thus calculated and magnetic forces generated and applied to the pendulums to compensate for the acceleration forces acting on the pendulums due to these changes in movement of the ship and to cause the pendulums to reproduce the movement of the ship and thus continue to indicate the true vertical while changes in the movement of the ship are taking place, i. e. forces are applied to the pendulum to cause its mass to accelerate at the same rate as the ship and consequently have no tendency to depart from the vertical.

Figure 2A:
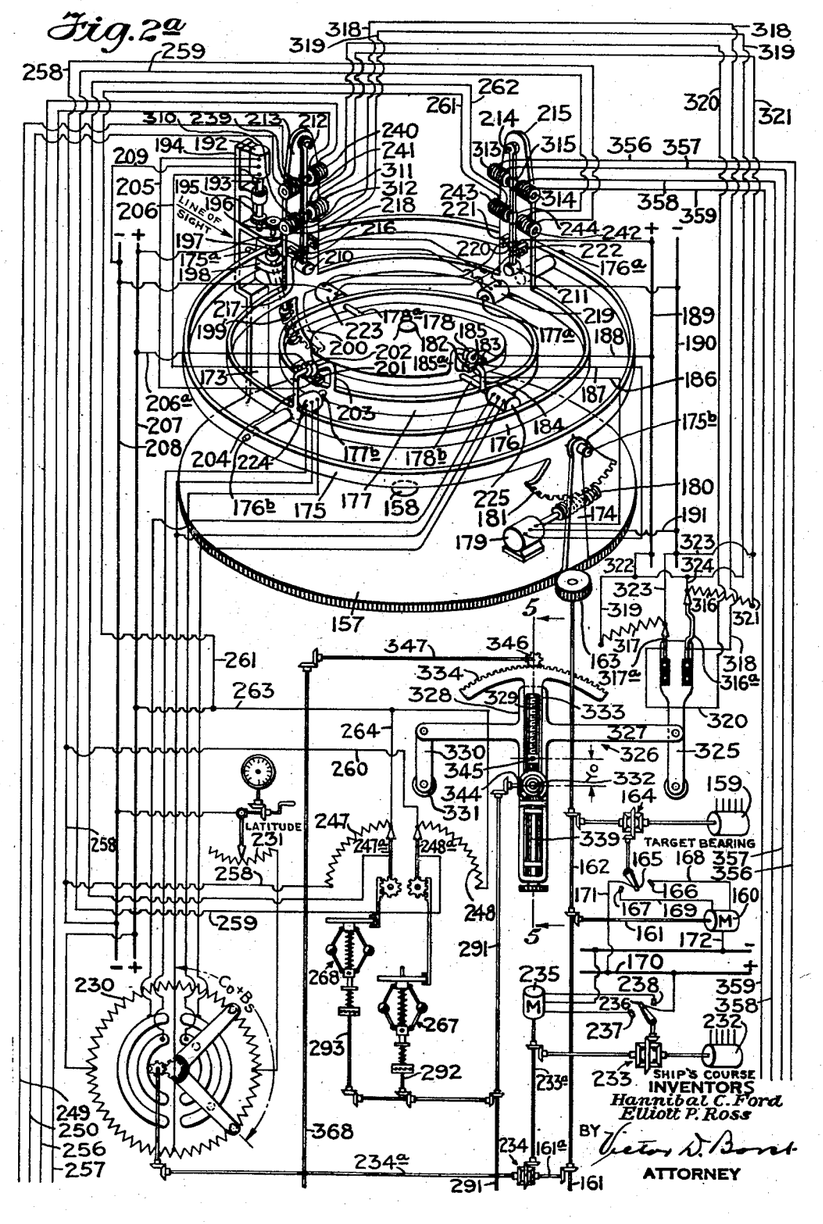
Figures 2B, 5:
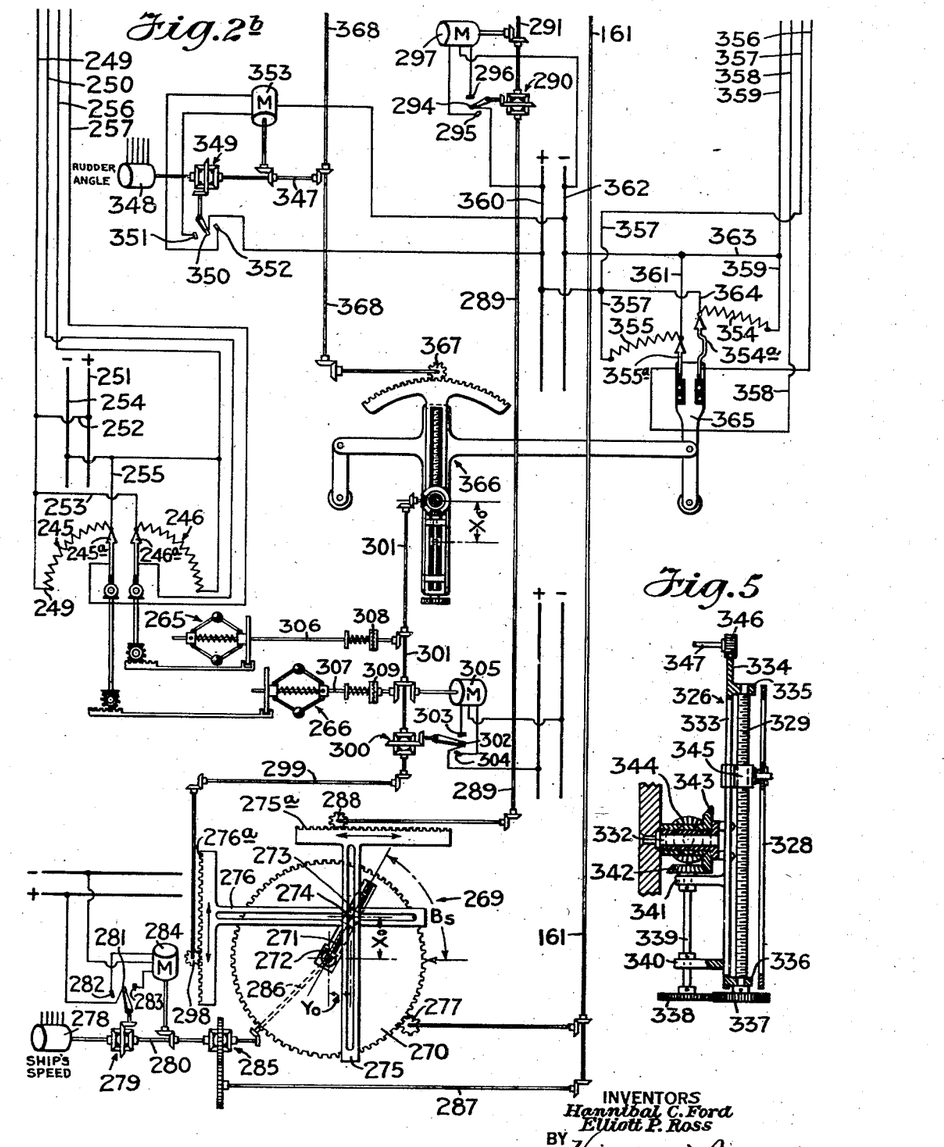

In Figs. 2a and 2b there is shown a gyroscopic system of the type described above but which includes a gyroscope that is mounted on a platform that may be rotated with respect to the deck of the ship upon which the gyroscope is mounted. That is to say, in the gyroscopic mechanism illustrated in Figs. 2a and 2b, the axes of the frame and phantom ring of the gyroscope mounting may depart from the fore and aft and athwartship lines of the ship. In consequence of this condition, and the fact that the mounting axes of the gyroscope may vary with respect to the axis of the ship, it is necessary to provide further compensation for the pendulums in order that the pendulums will indicate the true vertical at all times irrespective of changes in movement of the craft.

In the gyroscopic mechanism illustrated in Figs. 2a and 2b, there is a platform 157 that is rotatably mounted about an axis, perpendicular to the deck of the ship, represented by the end of a shaft 158. The platform 157 may be rotated in accordance with the operation of a repeater motor 159 controlled by a transmitter at a director, for example, operated to maintain a line of sight on a target. The repeater motor operates the contacts of a follow-up servo-motor 160 which is connected through shafts 161 and 162 to a pinion 163 that is mounted upon the shaft 162. The pinion 163 meshes with a gear formed on the periphery of the circular platform 157. The repeater motor 159 is connected to one side of a differential 164 and the other side of the differential is connected to shaft 162. The center of the differential operates a movable electrical contact 165 which operates between two stationary contacts 166 and 167.

The contact 166 is connected to the motor 160 through a conductor 168 and the contact 167 is connected to the motor through a conductor 169. The movable contact 165 is connected to a positive line wire 170 by a conductor 171 and the motor 160 is connected to the negative line wire through a conductor 172. Thus, upon operation of the repeater motor 159 the contact 165 will be moved to engage either the contact 166 or 167 and effect the operation of the motor 160 in the direction corresponding to the operation of the motor 159. Motor 160 will continue to operate and through the shaft 162 rotate the platform 157 until the rotation of the platform corresponds with the rotation of the repeater motor 159.

A pair of standards 173 and 174 extend perpendicular to the platform 157 at diametrically opposite points of the platform. Each of these standards has a bearing formed in the upper end thereof. A frame 175 has trunnions 175a and 175b that are journaled in the standards 173 and 174. Within the frame 175 there is mounted a phantom ring 176 having trunnions 176a and 176b that are journaled in the frame, the axis of the trunnions 176a and 176b extending at right angles to the axis of the trunnions of the frame. Within the phantom ring 176 there is mounted a gimbal ring 177. The gimbal ring is provided with trunnions 177a and 177b that are journaled in bearings in the phantom ring, the axis of the trunnions 177a, 177b being parallel to the axis of the phantom ring. Within the gimbal ring the gyroscope 178 is mounted. The gyroscope has trunnions 178a and 178b which are rotatably mounted in journals in the gimbal ring.

Through the medium of follow-up mechanism, the phantom ring is caused to follow the movement of the gyroscope. For this purpose, there is provided a follow-up servo-motor 179 which carries a worm 180. The worm 180 meshes with a segmental worm gear 181 secured to the frame 175 and concentric with the trunnion axis of the frame. The motor 179 is controlled through contacts 182 and 183. The contacts 182 and 183 are carried by a bracket 184 that is mounted on the gimbal ring 177. The contacts 182 and 183 are arcuate and concentric with the axis of the trunnions of the gyroscope. These contacts are spaced apart by a strip of insulating material. A cooperating electrical contact 185 is carried by a bracket 185a mounted upon the case of the gyroscope. Upon relative movement of the gimbal ring and gyroscope about the trunnion axis of the gyroscope, the contact 185 moves off of the central insulating strip between the contacts 182 and 183 and into contact with one or the other of these latter contacts depending upon the direction of the relative movement. The contact 182 is connected by an electrical conductor 186 to the motor 179, and the contact 183 is connected by a conductor 187 to the motor 179. The contact 185 is connected by a conductor 188 to a positive line wire 189. A negative line wire 190 is connected to the motor by a conductor 191. Thus, uopn engagement of the contact 185 with one or the other of the contacts 182 and 183, the motor 179 is energized and causes a movement of the frame about its trunnions until the gimbal ring 177 is positioned so that the contact 185 rests between the contacts 182 and 183. Since the phantom ring 176 is carried by the frame it likewise will be moved with the frame.

For moving the phantom ring about its trunnions 176a and 176b there is provided a follow-up motor 192 that is mounted with its shaft 193 perpendicular to the platform 157. The shaft 193 is journaled in a bracket 194 that extends from the upper end of the standard 173. On the shaft 193 there is a gear 195 secured to the shaft 193 and meshing with the gear 196 secured on to a shaft 197 journaled in the bracket 194. The shaft 197 has a flexible connection in line with the trunnions 175a and 175b and it is also journaled in a bearing bracket 198 carried by the frame 175. On the end of the shaft 197 there is mounted a worm 199 that meshes with a segmental worm gear 200 mounted on the phantom ring 176 and concentric with the trunnion axis of the phantom ring. The motor 192 is controlled by a pair of contacts 201 which cooperate with a roller contact 202. The contacts 201 are mounted on a bracket 203 secured to the gimbal ring 177 and the roller contact is mounted upon a bracket 204 mounted on the phantom ring. The contacts 201 are connected by conductors 205 and 206 to the motor 192. The contact 202 is connected by a conductor 206a to a positive line wire 207. A negative line wire 208 is connected to the motor through a conductor 209. It will thus be seen that upon relative movement of the gimbal and phantom ring about the trunnions of the gimbal the motor 192 will be operated and through the train of shafts and gears just described will operate the phantom ring about its axis represented by the trunnions 176a and 176b until the phantom ring corresponds with the movement of the gimbal about this axis. The phantom ring is thus caused to follow accurately the movements of the gyroscope.

For the purpose of providing a reference for the true vertical, there is provided a pair of pendulums 210 and 211. The pendulum 210 swings about a pivot 212 that is mounted in a bracket 213. The bracket 213 is mounted on the phantom ring adjacent to the trunnion 175a of the frame and the pivot 212 about which the pendulum 210 swings is approximately parallel to the axis of the frame. The pendulum 211 swings about a pivot 214 which is supported by a bracket 215 that is mounted on the phantom ring adjacent to the trunnion 176a. The pivot 214 is parallel to the axis of the phantom ring. The brackets 213 and 215 are mounted on the phantom ring which as heretofore stated partakes of the movement of the gyroscope.

Near the bob of the pendulum 210 there is mounted an electrical contact 216 which cooperates with stationary contacts, one on each side thereof, 217 and 218. The contacts 216, 217 and 218 control a torque applicator 219 which is mounted upon the phantom ring and which applies a torque to the trunnion 177a of the gimbal ring 177. The pendulum 211 carries, adjacent the bob, an electrical contact 220, which cooperates with stationary electrical contacts, one on each side thereof, 221 and 222. These contacts control the energization of a torque applicator 223 which applies a torque to the gyroscope about the axis 178a of the gyroscope, the torque applicator being mounted upon the gimbal ring 177. The electrical connection from these contacts on the pendulums are the same as in the system described in Fig. 1 and the description of these electrical connections will not be here given. It will be seen that when the pendulum 210 swings relative to its pivot by virtue of the phantom ring assuming a position other than the true horizontal with respect to movement about the frame trunnions 175a and 175b, the contact 216 carried by the pendulum will engage one or the other of the contacts 217 and 218 and cause a precessional torque to be applied to the gimbal ring and thus to the gyroscope. The gyroscope will respond by movement at right angles to the axis about which the precessional force is applied and thus cause the phantom ring to be moved to a position where the pendulum 210 will rest between the two contacts. Likewise movement of the phantom ring from the true horizontal about the axis 176a and 176b will cause the contact 220 on the pendulum 211 to engage either the contact 221 or the contact 222, and cause a precessional force to be applied through the torque applicator 223 about the trunnions 178a and 178b of the gyroscope. The gyroscope will respond by movement about the axis 176a and 176b of the phantom ring and thus bring the phantom ring to a position in which the contact 220 is between and out of contact with the contacts 221 and 222. The pendulums 210 and 211 will be between the stationary contacts only when the phantom ring represents the true horizontal and the spin axis of the gyroscope represents the true vertical.

The gyroscope is precessed continuously to compensate for the rotation of the earth in the same manner as the gyroscope illustrated in Fig. 1. The precessional mechanism includes torque applicators 224 and 225 and resistances 230 and 231. The resistance 231 is for compensating for the latitude at which the ship is operating and the resistance 230 is for distributing the compensating forces for the rotation of the earth between the torque applicators 224 and 225. These resistances and their manner of operation, with one exception which will be described, and their connection to the torque applicators and to the line wires are identical in all respects with that illustrated in conjunction with the gyroscopic mechanism disclosed in Fig. 1 of the drawings and a description of these will not here be repeated.

The only difference between the arrangement for compensating for the rotation of the earth disclosed in Fig. 1, and that disclosed in Fig. 2a, is that the arms of the resistance 230 are rotated not in accordance with the course angle of the ship but rather in accordance with the algebraic sum of the course angle of the ship and the angle that the trunnion axis 175a and 175b of the frame of the gyroscope makes with the fore and aft line of the ship. The conditions for which the gyroscopic mechanism illustrated in Figs. 2a and 2b are set is illustrated by the diagram in Fig. 3. In Fig. 3, there is illustrated the north and south line which is represented by the letter N at the top at the arrow. A line AB represents the course of the ship and the angle NAB represents the course angle $C_o$ of the ship. The line AB is a vector representing the speed of the ship. A line AC represents the direction of the axis of the frame of the gyroscopic mechanism. It will be seen that this line AC forms with the line AB an angle BAC represented by $B_s$. The arms of the resistance are therefore rotated in accordance with the sum of the angle $C_o$ and $B_s$.

This rotation of these arms is accomplished through the following mechanism: The angle $C_o$ is obtained from a compass receiver 232 which is connected to one side of a differential 233. The other side of the differential 233 is connected to a shaft 233a to which is also connected the shaft of a follow-up motor 235. The center of the differential operates a movable contact 236 which cooperates with stationary contacts 237 and 238. Upon operation of the compass repeater the contact 236 engages one or the other of the contacts 237, 238 depending upon the direction of movement of the compass receiver, and causes the operation of the follow-up motor 235 until the contact 236 is again brought between the two stationary contacts. Thus the shaft 233a is rotated in accordance with the compass angle of the ship. The shaft 233a is connected to a differential 234 and in this differential there is added to the compass angle $C_0$ of the ship the angle $B_s$ which is introduced to the differential 234 through a shaft 161a. The other side of the differential is connected through a shaft 234a to the arms of the resistance 230. The quantity $B_s$ is obtained from the repeater motor 159. As previously stated, the follow-up motor 160 effects the rotation of a shaft 161 in accordance with the rotation of the repeater motor and the platform 157. The shaft 161a is connected to the shaft 161. Thus, the resistance 230 causes torques to be applied to the gyroscope about its mutually perpendicular axes in accordance with $E \cos \phi \sin(C_0+B_s)$ and $E \cos \phi \cos(C_0+B_s)$.

Forces are applied to the pendulums 210 and 211 through electromagnets to offset the drag upon the pendulums by virtue of changes in the speed of the ship upon which the gyroscope is mounted. In this instance it is necessary to apply compensating forces to both of the pendulums when the trunnion axis of the frame of the gyroscopic system does not coincide with the fore and aft line of the ship. Whenever the trunnion axis of the frame of the gyroscopic mechanism deviates from the fore and aft line of the ship, acceleration forces will affect both of the pendulums in proportion to the deviation of the trunnion axis of the frame from the fore and aft line of the ship. For this reason, there are provided electromagnets 239 and 240 for applying an electromagnetic force to an armature 241 on the arm of the pendulum 210. Similarly, there are provided electromagnets 242 and 243 for applying the electromagnetic forces to an armature 244 on the arm of the pendulum 211. The energization of the magnets 239 and 240 is controlled by resistances 245 and 246 similar in all respects to the resistances 106 and 108 of Fig. 1. The energization of electromagnets 242 and 243 is controlled by resistances in the form of potentiometers 247 and 248 which also are in all respects similar to the resistances 106 and 108 of the system illustrated in Fig. 1.

The electromagnet 239 is connected respectively by conductors 249 and 250 to one side of the resistance 246 through conductor 253 and to the movable arm 246a which moves over the resistance 246. The conductor 249 is also connected to the positive line wire 251 by a conductor 252. The resistance 245 is connected to a negative line wire 254 by a conductor 255 and to the positive line wire 251 by the conductors 249 and 252. The electromagnet 240 is connected respectively by conductors 256 and 257 to one end of the resistance 245 through conductor 255, and the arm 245a that moves over the resistance 245. Thus, these resistances in the form of potentiometers control the energization of the magnets 239 and 240.

The magnet 242 is connected through conductors 258 and 259 respectively to one end of the resistance 248 through conductors 260, and an arm 248a that moves over the resistance 248. The wire 258 is also connected to the negative line wire 208 and to one end of the resistance 247. The electromagnet 243 is connected by conductors 261 and 262 respectively to one end of the resistance 247 through conductors 263 and 264 and an arm 247a that moves over the resistance 247. The wire 261 is also connected through the conductor 263 to the positive line wire 207. One end of the resistance 247 is therefore connected to the positive conductor 207.

The arm 245a of the potentiometer 245 is actuated through a centrifugal device 266. The arm 246a of the potentiometer 246 is moved over the resistance 246 by a centrifugal device 265. A similar centrifugal device 267 actuates the arm 248a over the resistance 248 and another similar centrifugal device 268 actuates the arm 247a over the resistance 247.

A vector diagram representing the relation of the ship's speed with respect to the trunnion axis of the frame of the gyroscopic mechanism is illustrated in Fig. 3. In this figure, the vector $Ab$ represents the speed of the ship, the ship traveling along the line $AB$. The trunnion axis of the frame of the gyroscope mechanism is parallel to or is represented by the line $AC$. Resolving the ship's speed into the components along and across the trunnion axis of the frame of the gyroscope there is obtained the components $Y_0$ and $X_0$. The centrifugal devices 265 and 266 for affecting the magnets 239 and 240 are actuated, and the corresponding magnets energized in accordance with changes in the component of the ship's speed represented by the component $X_0$ and the centrifugal devices 267 and 268 which control the energization of magnets 242 and 243 are actuated in accordance with changes in the component of the ship's speed along the trunnion axis of the frame or in proportion to the component $Y_0$. To obtain these components of the ship's speed and so actuate the centrifugal devices in the manner mentioned there is provided a component solver 269.

The component solver is of a type well known in the art and includes a rotatably mounted plate 270 having thereon a radially mounted screw-shaft 271. The screw-shaft is operated through a pair of bevel gears 272, one of which is journaled in the plate and the other of which is mounted on the screw-shaft. Threaded onto the screw-shaft there is a block 273 that carries a pin 274 which extends perpendicular to the surface of the plate. The pin 274 extends through slotted bars 275 and 276 which extend at right angles to each other. These slotted bars are constrained to movement laterally. The bar 275 carries a rack, (indicated diagrammatically) 275a and the bar 276 carries a rack 276a which are respectively perpendicular to the bars of which they form a part. The plate 270 has a gear on the periphery thereof which meshes with a gear 277 that is rotated by the shaft 161, which as heretofore mentioned is rotated in accordance with the angle $B_s$ or the angle that the trunnion axis of the frame of the gyroscopic mechanism makes with the fore and aft line of the ship. The pin 274 is set relative to the center of the plate 270 to a position representing the speed of the ship by the screw shaft 271.

The speed of the ship is obtained from a repeater motor 278 which is connected to one side of the differential 279. The other side of the differential 279 is connected to a shaft 280 and the center of the differential is connected to move a movable electrical contact 281. The electrical contact 281 cooperates with stationary contacts 282 and 283 for the purpose of controlling a follow-up motor 284. The follow-up motor 284 is connected to the shaft 280 and thus the shaft 280 is driven by the motor 284 in accordance with the movement of the repeater motor 278. The shaft 280 is connected to one side of the differential 285, the other side of which is connected by a shaft 286 to the bevel gear 272. The center of the differential 285 is connected by a shaft 287 to the shaft 161. The purpose of the differential 285 is to offset the effect on the screw-shaft 271 of the rotation of the plate 270. In the absence of the differential 285 rotation of the plate 270 would cause the gear on the screw-shaft to turn with respect to the other bevel gear as it walked around it. The differential 285 offsets this effect so that the rotation of the screw-shaft 271 is only effected by rotation of the repeater motor 278.

From this arrangement, in a manner that is well known in the art, the components of the speed of the ship along and across the trunnion axis of the frame of the gyroscope are obtained. The component along the trunnion axis or the component $Y_0$ is obtained from movement of the rack 275a. This rack meshes with a gear 288 which is connected to a shaft 289. The shaft 289 is connected to one side of a differential 290 and the other side of the differential is connected to a shaft 291 to which the centrifugal devices 267 and 268 are connected respectively by shafts 292 and 293 which contain unidirectional clutches. The center of the differential operates a movable contact 294 which cooperates with stationary contacts 295 and 296 and so control a follow-up servo-motor 297 which is also connected to the shaft 291. The centrifugal devices 267 and 268 are thus driven in accordance with changes in the speed of the craft along the trunnion axis of the frame of the gyroscope.

The component of the speed of the ship at right angles to the trunnion axis of the frame of the gyroscope is obtained from the rack 276a. This rack meshes with a pinion 298 that is connected onto a shaft 299. The shaft 299 is connected to one side of a differential 300. The other side of the differential 300 is connected to a shaft 301. The center of the differential operates a movable electrical contact 302 that cooperates with a pair of stationary contacts 303 and 304. The stationary contacts 303 and 304 control the energization of a follow-up servo-motor 305. The servo-motor 305 is connected to the shaft 301. Likewise, the centrifugal devices 265 and 266 are connected to the shaft 301 respectively through shaft 306 and 307.

The shaft 306 has interposed therein a unidirectional clutch 308 and the shaft 307 has interposed therein a unidirectional clutch 309. Direction of transmission of motion through the clutches 308 and 309 is opposite, that is, the clutch 308 will transmit motion to the centrifugal device 265 when the shaft 301 rotates in one direction, but will not transmit it when it rotates in the opposite direction. The unidirectional clutch 309 on the other hand will transmit rotation of the shaft 301 in the direction opposite to the direction through which motion is transmitted through the unidirectional clutch 308.

Due to the speed measuring action of the centrifugal devices it will be seen that the potentiometers 247 and 248 are operated in accordance with the rate of change of the component of the ship's speed along the trunnion axis of the frame of the gyroscope and the potentiometers 245 and 246 are actuated in accordance with the rate of change of the component of the ship's speed across or at right angles to the trunnion axis of the frame of the gyroscope.

For the purpose of compensating for acceleration forces acting on the pendulum due to changes in course of the ship there is likewise provided a pair of electromagnets for each of the pendulums. For the pendulum 210 there are provided electromagnets 310 and 311 mounted on the bracket 213 and positioned to act upon an armature 312 mounted upon the arm of the pendulum. Electromagnets 313 and 314 are mounted on opposite sides of the arm of the pendulum 211, the electromagnets 313 and 314 being mounted on the bracket 215 and positioned to act upon an armature 315 mounted upon the arm of the pendulum 211. These electromagnets are energized to provide a force on the armatures proportional to the product of the rate of turning of the ship and the components of the speed of the ship along and at right angles to the trunnion axis of the frame of the gyroscope. In this connection it will be appreciated that conditions may arise whereby these acceleration forces will be negative instead of positive, for example, when the trunnion axis of the gyroscope is rotated 180° with respect to the fore and aft line of the ship. For this reason, the multipliers utilized in providing the product of the rudder angle of the ship and the square of the components of the speed of the ship are slightly different from the multipliers used where the gyroscopic mechanism is fixed with respect to the fore and aft line of the ship.

The energization of the electromagnet 310 is controlled by a resistance 316, and energization of the magnet 311 is controlled by a resistance 317. For this purpose, opposite sides of the electromagnet 310 are connected by conductors 318 and 319 respectively to an arm 316a that moves over the resistance 316 and one side of the resistance 316 through a conductor 324. The electromagnet 311 is connected by conductors 320 and 321 respectively to an arm 317a that moves over the resistance 317 and one side of the resistance 317 through a conductor 323. The conductor 319 is also connected through a conductor 322 to the positive line wire 189 and the opposite end of the resistance 317 is connected through the conductor 323 to the negative line wire 190. The outer end of the resistance 316 is connected to the negative line wire 190 by the conductors 321 and 323. Thus, upon movement of the arms 316a and 317a over their respective resistances 316 and 317 the electromagnets are energized in proportion to the amount these arms move from the position in which they are shown.

The arms 316a and 317a are mounted in common upon a lever 325 of a multiplier 326. The multiplier is the type well known in the art and consists of a link 327 having a transverse bar 328 with a slot therein. The link is pivotally connected to the lever 325 at one end and at the opposite end it is pivotally connected to one end of a lever 330 that is pivoted at 331. Mounted adjacent the transverse bar 328 and pivoted to swing about a fixed pivot 332 is a bar 333 which carries as an integral part thereof an arcuate rack 334. A screw-shaft 329 is rotatably mounted in brackets 335 and 336 (see Fig. 5) opposite a slot in the bar 333. The screw-shaft 329 is operated through gears 337 and 338. The gear 338 is secured on one end of a shaft 339 that is journaled in brackets 340 and 341 mounted upon the bar 333. On the opposite end of the shaft 339 there is a bevel gear 342 that meshes with bevel gear 343. The bevel gear 343 which is mounted concentric with the pivot 332 meshes with the bevel gear 344 which is rotated by the shaft 291. On the screw-shaft 329 there is threaded a pivoted block 345 that extends into the slot in the bar 328. Since the shaft 291 is, as heretofore described, rotated in accordance with the component of the ship's speed parallel to the trunnion axis of the frame of the gyroscope the block 345 will be positioned along the screw-shaft, on either side of the center thereof, in accordance with the component of the ship's speed along the trunnion axis of the frame of the gyroscope, and more particularly proportional to the square of the component of the ship's speed since the screw on the shaft is cut to effect this result. The arcuate rack 334 meshes with a gear 346 that is mounted upon a shaft 347. The shaft 347 is rotated in accordance with the operation of a repeater motor 348 that is actuated in accordance with the rudder angle of the ship. The repeater motor 348 is connected to one side of a differential 349 and the shaft 347 is connected to the other side of this same differential. The center of the differential operates a movable electrical contact 350 that cooperates with stationary contacts 351 and 352 for controlling the operation of a follow-up servo-motor 353. The servo-motor 353 is also connected to the shaft 347 so that the shaft 347 is driven by the servo-motor in accordance with the operation of the repeater motor 348. Thus the bar 333 is swung about the pivot 332 in accordance with the rudder angle of the ship. Depending upon the position of the block 345 with respect to the center 332 the link 327 will be moved a greater or lesser extent and in a direction corresponding to the position of the block with respect to the center 332. Such movement of the link 327 will be transmitted to the lever 325 and thus cause the movement of the arms 316a and 317a over the resistances 316 and 317.

In a similar manner the magnets 313 and 314 are energized in accordance with the product of the rudder angle of the ship and the square of the component of the speed of the ship across or at right angles to the trunnion axis of the frame of the gyroscopic mechanism. For the purpose of controlling the energization of these magnets there are provided resistances or potentiometers 354 and 355. The electromagnet 313 is connected by conductors 356 and 357 respectively to an arm 354a of the potentiometer 354 and one end of the resistance 354 through a conductor 364. The electromagnet 314 is connected by conductors 358 and 359 respectively to an arm 355a of the potentiometer 355 and one side of the resistance 355 through conductors 363 and 361. The wire 357 is also connected to a positive line wire 360 and thus one side of the resistance 355 is connected to this positive line wire. The other end of the resistance 355 is connected through conductors 361 and 363 to negative line wire 362. The conductor 359 is connected by conductor 363 to the negative line wire 362 and the other side of the resistance 354 is connected by a conductor 364 to the positive line wire 360. Thus, through these connections the potentiometers 354 and 355 control the energization of the magnets 313 and 314 in accordance with the movement of the arms 354a and 355a over the resistances. The arms 354a and 355a are mounted in common upon a lever 365 which forms a part of a multiplier 366.

The multiplier 366 is in all respects similar to the multiplier 326 and the details thereof will not be described. The screw-shaft of the multiplier 366 is rotated in accordance with the rotation of shaft 301 which as heretofore described is rotated in accordance with the component of the ship's speed across the trunnion axis of the frame of the gyroscope. The arcuate rack of the multiplier 366 is actuated through a gear 367 that is connected to a shaft 368 which in turn is connected to the shaft 347. The inputs to the multiplier are therefore the rudder angle of the ship and the square of the component of the speed of the ship at right angles to the trunnion axis of the gyroscope. The product of these is represented by the movement of the arm 365 and the energization of magnets 313 and 314 is in proportion to the product of the rudder angle of the ship and the square of the component of the speed of the ship at right angles to the trunnion axis of the frame of the gyroscope.

Figure 4:
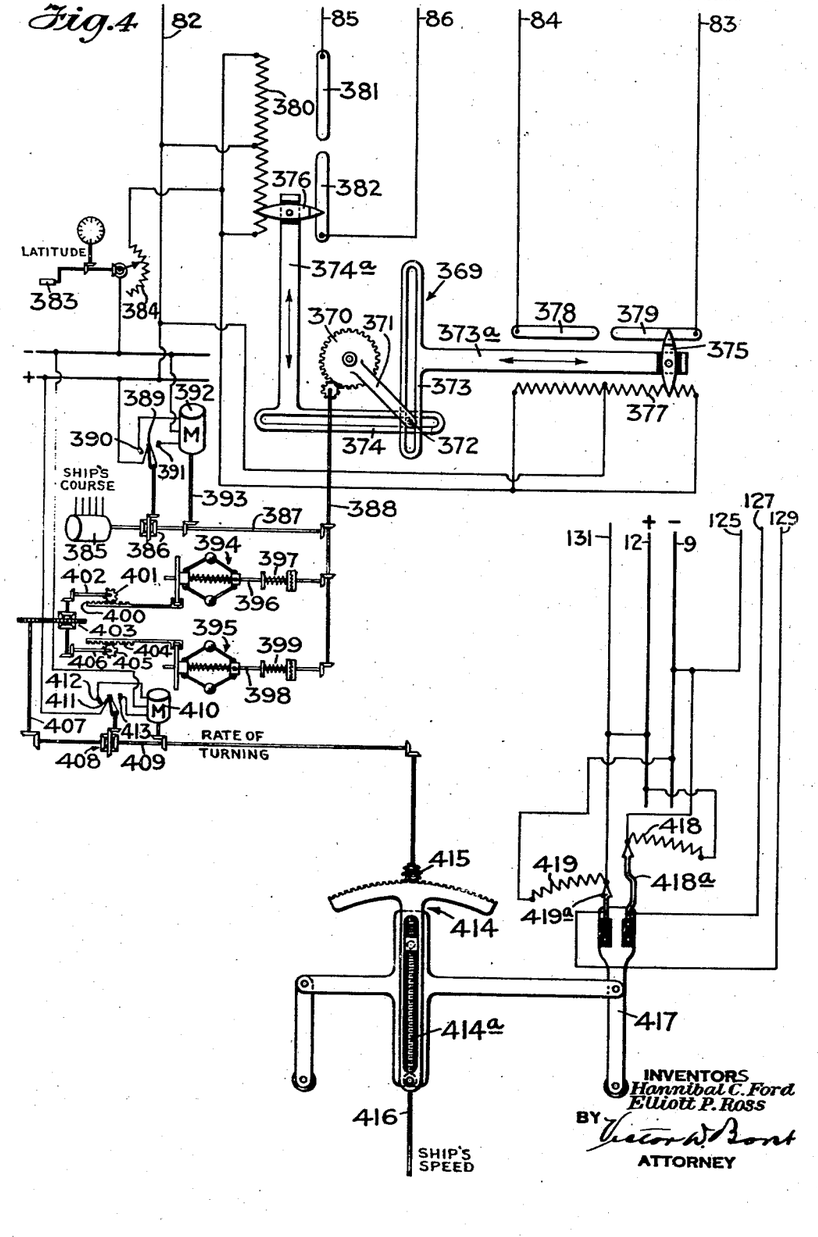
Fig. 4 shows a modified form of part of the gyroscopic mechanism.

In Fig. 4 of the drawings there is illustrated a modified form of a portion of the system illustrated in Fig. 1. In the system illustrated in Fig. 4 the effect of the rotation of the earth is compensated by potentiometers which are operated by a component solver that resolves the movement of the earth into components along and transverse to the fore and aft line of the ship or along and transverse to the trunnion axis of the frame of the gyroscope. In addition, the rate of turning of the ship is utilized directly in controlling the energization of the electromagnets for counteracting the effect on the pendulums of centrifugal force due to changes in course of the ship. It is in this respect that the system illustrated in Fig. 4 differs from that previously described.

For the purpose of providing a current proportional to the rotation of the earth with respect to the trunnion axis of the frame of the gyroscope and at right angles thereto, there is provided a component solver 369. This component solver consists of a plate 370 which has formed integral therewith a radial arm 371. The radial arm carries a pin 372 which extends through slots in bars 373 and 374, the bars 373 and 374 being mutually perpendicular. The pin 372 is fixed in its relation to the arm 371 as the rotation of the earth is a constant factor. The bar 373 carries a lateral arm 373a upon which is mounted a transverse electrical contact 375. Similarly, the bar 374 carries a lateral arm 374a that has mounted thereon a transverse electrical contact 376. The contacts 375 and 376 are electrically insulated from the arms upon which they are mounted. The contact 375 travels over a resistance 377 and makes contact between the resistance 377 and spaced contact bars 378 and 379. The contact 375 and resistance 377 and the contact bars 378 and 379 are in all respects similar, in so far as their electrical relation is concerned, to the arm 55b and the circular resistance 55 and bars 80 and 81. The resistance 377 instead of being arranged in the form of a circle or semicircle, is arranged linearly. Similarly, the contact 376 travels over a resistance 380 and makes contact between the resistance 380 and spaced electrical conductor bars 381 and 382. The conductor bars 382 and 381 and the resistance 380 correspond with the bars 78 and 79 and the circular resistance 55. These resistances and bars are connected to the torque applicators 53 and 54 in the same manner as the resistance 55 is connected to those torque applicators.

The correction for the latitude at which the ship is traveling is inserted manually through a crank handle 383. This causes a variation in a resistance 384 and so a variation in the voltage across resistances 377 and 380 so that the voltage supplied is proportional to the rotation of the earth modified by the cosine of the latitude at which the ship is traveling.

The plate 370 is rotated in accordance with the course angle of the ship. The course angle of the ship is obtained from a compass repeater 385 which is connected to one side of a differential 386. The other side of the differential is connected to a shaft 387 which in turn is connected to a shaft 388. The center of the differential operates a movable electrical contact 389 that cooperates with two stationary contacts 390 and 391. The contacts 389, 390 and 391 control the operation of a follow-up servo-motor 392 which is connected by a shaft 393 to the shaft 387. The shaft 387 is thus driven in accordance with the movement of the repeater motor 385. The plate 370 and the arm 371 are thus rotated in accordance with the compass angle of the ship and the bars 373 and 374 represent the components of this movement along and across the trunnion axis of the frame of the gyroscope.

The shaft 388 is also connected to centrifugal devices 394 and 395. This connection is effected to the centrifugal device 394 through a shaft 396 in which there is interposed a unidirectional clutch 397. The centrifugal device 395 is connected to the shaft 388 through a shaft 398 including a unidirectional clutch 399. The unidirectional clutches 397 and 399 operate to transmit motion when the shaft 388 rotates in one direction or the other, that is, each clutch will transmit the opposite direction of motion of the shaft 388. The centrifugal device 394 operates, through a rack 400, a gear 401 connected through a shaft 402 to one side of a differential 403. The centrifugal device 395 operates, through a rack 404, a gear 405 that is connected by a shaft 406 to the other side of the differential 403. The algebraic sum of these movements is represented by the movement of the center of the differential which is connected by a shaft 407 to one side of another differential 408. The other side of the differential 408 is connected to a shaft 409 that is operated by a follow-up servo-motor 410. The follow-up servo-motor is controlled by a movable contact 411 that is operated through the center of the differential 408 and cooperating with stationary contacts 412 and 413. The shaft 409 is thus power-driven in accordance with the movement of the shaft 407. The shaft 409 drives one side of a multiplier 414 through a gear 415 that is driven by the shaft 409. The other side of the multiplier 414, or the uniform lead screw-shaft 414a, is operated in accordance with the rotation of a shaft 416 that is operated in accordance with the speed of the ship. Through the arrangement of the centrifugal devices 394 and 395 the rate of turning or the rate of change in compass angle of the vessel is obtained and thus the gear 415 is rotated in amount representing the rate of turning of the ship. When the rate of turning of the ship is multiplied by the speed of the ship the product is proportional to the acceleration or centrifugal forces which act upon the pendulums due to changes of course of the ship. The multiplier 414 is connected to operate a lever 417 which actuates arms 418a and 419a of potentiometers 418 and 419. These potentiometers are connected in the same manner as the potentiometers 123 and 124 to the electromagnets which act on the armatures connected to the arms of the pendulums.

From the foregoing it will be seen that there is provided by the invention herein disclosed and described a freely mounted gyroscope which is maintained at all times with its spin axis vertical. The spin axis of the gyroscope is maintained vertical through reference pendulums which are prevented from assuming the pseudo-vertical upon changes in the movement of the ship by mechanism which continuously calculates and generates forces proportional and opposite to the acceleration forces acting on the pendulums which forces are applied to and prevent any lag of the pendulums and cause them accurately to partake of the changes in the motion of the vessel. In consequence of the spin axis of the gyroscope representing the true vertical at all times, the phantom ring of the freely mounted gyroscope must represent the true horizontal at all times. There is thus provided a gyroscopic mechanism by means of which there is a reference, on a moving vessel, of the true vertical and the true horizontal.

It will also be seen that a pendulum or pendulums corrected for accelerations as herein disclosed constitute a stable vertical and in many cases may be used as such without the filtering effect obtained by interposing a gyroscope between the vertical determined by the pendulous mass and the follow-up mechanism. In other words the pendulous mass which determines the true vertical at all times may directly control the follow-up mechanism. In such cases, since the pendulous mass continually remains at the vertical due to the compensation for accelerations, no correction is necessary for the rotation of the earth or movement of the ship over the earth other than that effected by the natural pull of gravity.

It will be obvious that various changes may be made by those skilled in the art in the details of the embodiment of the invention disclosed in the drawings and described above within the principle and scope of the invention as expressed in the appended claims.

We claim:

1. In a gyro vertical for use on a moving craft, the combination comprising a gyroscope support, a gyroscope mounted in the support for movement about mutually perpendicular axes, a pendulum mounted to swing about an axis parallel to one of said mutually perpendicular axes, means controlled by movement of the pendulum about its axis relative to the support for exerting a precessing force about the other of said mutually perpendicular axes, means for generating forces proportional to the changes in movment of the craft at right angles to the axis about which the pendulum swings, and means for applying the generated forces to the pendulum to annul in the pendulum the effect of the changes in the course and speed of the craft.

2. In a gyro vertical for use on a moving craft, the combination comprising a gyroscope support, a gyroscope mounted in the support for oscillation about mutually perpendicular horizontal axes, a pendulum, means controlled thereby for exerting a precessing force to effect precession of the gyroscope about said mutually perpendicular axes upon pivotal movement of the pendulum relative to the gyroscope, means for generating forces proportional to the changes in rate of movement of the craft, means for applying the generated forces to the pendulum to annul in the pendulum the effect of changes in the course and speed of the craft, and means for applying precessing forces to the gyroscope about said axes proportional to the components of rotation of the earth including means for generating precessing forces proportional to said components.

3. In a gyro vertical for use on a moving craft, the combination comprising a gyroscope support adapted to be fixed to the craft, a frame mounted in the support for oscillatory movement about an axis parallel to the base of the gyroscope support, a phantom ring mounted in the frame for movement about an axis perpendicular to the axes of the frame, a gimbal ring mounted in the phantom ring for movement about an axis parallel to the axis of the phantom ring, a gyroscope mounted in the gimbal ring for movement about an axis parallel to the axis of the frame, means for effecting movement of the phantom ring in accordance with the relative angular movements of the gyroscope, a pendulum supported by the phantom ring to swing about an axis parallel to the axis of the frame, means actuated by relative movement of the pendulum and phantom ring for applying a precessing force on the gyroscope upon the inclination of the phantom ring and frame about the axis of the frame, another pendulum supported by the phantom ring to swing about an axis parallel to the axis of the phantom ring, means actuated by the said latter pendulum for applying a precessing force on the gyroscope upon the inclination of the phantom ring about its axis, and means for compensating for the effect on the pendulums of changes in the speed and course of the craft.

4. In a gyro vertical for use on a moving craft, the combination comprising a gyroscope support, a freely mounted gyroscope in the support, a suspended mass arranged and connected to exert a vertical-seeking precessing force on the gyroscope, means for generating forces proportional to changes in the rate of movement of the craft, and means for applying such forces to the mass to compensate for the drag on said mass upon changes in the rate of movement of the craft.

5. In a gyro vertical for use on a moving craft, the combination comprising a gyroscope, a suspended mass arranged and connected to exert a vertical-seeking precessing force on the gyroscope, and means for compensating for the effect on the suspended mass of changes in the course of the craft including means for generating forces proportional to the product of the rudder angle and the square of the speed of the craft, and means for applying said forces to the suspended mass.

6. In a gyro vertical for use on a moving craft, the combination comprising a gyroscope support, a freely mounted gyroscope in the support, a pendulum arranged and connected to exert a vertical-seeking force on the gyroscope, means for generating forces proportional to the changes in the rate of movement of the craft, and means for applying such generated forces to the pendulum to annul in the pendulum the effect of the changes in the rate of movement of the craft.

7. In a gyro vertical for use on a moving craft, the combination comprising a gyroscope support, a gyroscope mounted in the support for movement about mutually perpendicular axes, a pendulum mounted to swing about an axis parallel to one of said mutually perpendicular axes, means for exerting a precessing force upon the gyroscope about the other of said mutually perpendicular axes upon relative movement of the pendulum about its axis, and means for applying forces to the pendulum to compensate for the effect thereon of changes in the rate of movement of the craft at right angles to the axis about which the pendulum swings.

8. In a gyro vertical for use on a moving craft, the combination comprising a gyroscope, a pendulum arranged and connected to exert a vertical-seeking precessing force on the gyroscope upon relative tilt therebetween, and means for annulling the effect on the pendulum of changes in the course of the craft including means for generating forces proportional to the product of the rate of turning and the speed of the craft and means for applying said generated forces to the pendulums.

9. In a gyro vertical for use on a moving craft, the combination of a gyroscope support, a gyroscope mounted in the support, pendulous means arranged and connected to exert vertical-seeking precessing forces on the gyroscope, means responsive to accelerations of the craft and means controlled by said responsive means for applying forces to said pendulous means to neutralize the effect of the accelerations on the pendulous means.

10. In a gyro vertical for use on a moving craft, the combination of a gyroscope support, a gyroscope mounted in the support, pendulous means arranged and connected to exert vertical-seeking precessing forces on the gyroscope, means responsive to accelerations of the craft and means controlled by said responsive means for applying forces to said pendulous means to neutralize the effect of the accelerations on the pendulous means, and means for applying precessing forces to the gyroscope proportional to the rotation of the earth.

11. In a gyro vertical for use on a moving craft the combination comprising a platform mounted for rotation about an axis perpendicular to the deck of said craft, means for rotating the platform, a gyroscope mounted on the platform for movement about mutually perpendicular axes, a suspended mass arranged and connected to exert a vertical-seeking precessing force on the gyroscope, means for generating forces proportional to changes in the rate of movement of the craft in components along said axes, means for applying such forces to the mass to compensate for the drag on said mass upon changes in the rate of movement of the craft, means for generating forces proportional to the angular relation of the platform to the craft in components along the said axes, and means for applying such forces to the mass to compensate for the drag on said mass upon changes in the position of the platform relative to the craft.

12. In a gyro vertical for use on a moving craft the combination comprising a platform mounted for rotation about an axis perpendicular to the deck of said craft, means for rotating the platform, a gyroscope mounted on the platform for movement about mutually perpendicular axes, a suspended mass arranged and connected to exert a vertical-seeking precessing force on the gyroscope, electric means for generating forces proportional to changes in the rate of movement of the craft in components along said axes, electromagnetic means or applying such forces to the mass to compensate for the drag on said mass upon changes in the rate of movement of the craft, electric means for generating forces proportional to the angular relation of the platform to the craft in components along the said axes, and electromagnetic means for applying such forces to the mass to compensate for the drag on said mass upon changes in the position of the platform relative to the craft.

13. In a gyro vertical for use on a moving craft, the combination comprising a gyroscope support, a gyroscope mounted in the support for movement about mutually perpendicular axes, two pendulums mounted to swing in axes perpendicular to each other and respectively parallel to the said mutually perpendicular axes, means controlled by the movements of the pendulums about their respective axes relative to the support for exerting precessing forces about the other of the said mutually perpendicular axes respectively, means for generating forces proportional to the changes in movement of the craft at right angles to the axes about which the respective pendulums swing, and means for applying the generated forces to the pendulums to annul in the pendulums the effect of the changes in the course and speed of the craft.

14. A gyro vertical, comprising a universally mounted gyroscope pendulum means effective to maintain the spin axis of said gyroscope vertical, means responsive to both directional and velocity accelerations, and means controlled by said acceleration responsive means to apply forces to said pendulum means proportional to a function of such accelerations, said forces being effective to neutralize the effect on said pendulum means of said accelerations and thereby to maintain said pendulum means and the spin axis of the gyroscope vertical.

15. In a gyro vertical for use on a moving craft, the combination comprising a gyroscope support, a gyroscope mounted in the support for movement about mutually perpendicular axes, a pendulum mounted to swing about an axis parallel to or coincident with one of said mutually perpendicular axes, means controlled by movement of the pendulum about its axis relative to the support for exerting a precessing force about the other of said mutually perpendicular axes, means for generating forces proportional to the changes in movement of the craft at right angles to the axis about which the pendulum swings, and means for applying the generated forces to the pendulum to annual in the pendulum the effect of the changes in the course and speed of the craft.

16. In a gyro vertical for use on a moving craft, the combination comprising a gyroscope support, a gyroscope mounted in the support for movement about mutually perpendicular axes, a pendulum mounted to swing about an axis parallel to or coincident with one of said mutually perpendicular axes, means for exerting a precessing force upon the gyroscope about the other of said mutually perpendicular axes upon relative movement of the pendulum about its axis, and means for applying forces to the pendulum to compensate for the effect thereon of changes in the rate of movement of the craft at right angles to the axis about which the pendulum swings.

17. In apparatus of the class described, a gyro horizon for aircraft, means for exerting a stabilizing force thereupon, means normally defining the true vertical but tending to establish an apparent vertical during acceleration and deceleration of the aircraft, means for governing the first named means in response to movements of the gyro horizon relative to the means defining the true vertical, means for exerting a force upon the vertical defining means, and means responsive to acceleration and deceleration of the aircraft for controlling the last named means to prevent said vertical defining means from establishing an apparent vertical.

18. In apparatus of the class described, a gyro rotor in gimbal ring suspension, means for exerting a stabilizing moment upon said suspension, a pendulum normally defining the true vertical but tending to establish an apparent vertical when acceleration forces act thereon, means for actuating the first named means in response to movements of said suspension from a predetermined angular relation with said pendulum, means for exerting a stabilizing moment upon the pendulum, and means responsive to acceleration forces for controlling the last named means to prevent said pendulum from establishing an apparent vertical.

19. The combination with a gyro horizon including a gimbal ring suspension of means for exerting a stabilizing moment upon the suspension, gravity responsive means for controlling the first named means, and acceleration responsive means for actuating said gravity responsive means to compensate for the effect of acceleration upon the gravity responsive means.

20. The combination with a gyro horizon of means for exerting a stabilizing moment thereupon, gravity responsive means for governing the first named means, acceleration responsive means, and means for operatively interconnecting the acceleration responsive means and the gravity responsive means to prevent the latter from establishing an apparent vertical.

21. In a gyroscopic artificial horizon for aircraft, comprising a gyroscope including a rotor having a normally vertical spin axis and mounted for relative angular movement about two horizontal axes mutually perpendicular to said spin axis, the combination with said gyroscope of means normally defining the true vertical but tending to define an apparent vertical during acceleration or deceleration of the aircraft, means responsive to acceleration and deceleration of said aircraft for actuating said vertical defining means to counteract the tendency thereof to establish an apparent vertical, whereby said vertical defining means define the true vertical at all times, and means responsive to relative movement between said vertical defining means and the spin axis of said rotor for applying a torque to said gyroscope to cause precession of said spin axis to the true vertical.

HANNIBAL C. FORD.
ELLIOTT P. ROSS.